United States Patent
Ferrara

[11] 3,924,893
[45] Dec. 9, 1975

[54] VENTILATED VEHICLE SEAT

[75] Inventor: Rudolph A. Ferrara, Warren, Mich.

[73] Assignee: General Motors Corporation, Detroit, Mich.

[22] Filed: Oct. 17, 1974

[21] Appl. No.: 515,583

[52] U.S. Cl. ............................ 297/455; 297/453
[51] Int. Cl.² ........................................ A47C 7/02
[58] Field of Search .......... 297/452, 453, 455, 456, 297/458–460

[56] References Cited
UNITED STATES PATENTS

| | | | |
|---|---|---|---|
| 1,929,110 | 10/1933 | Ferris | 297/455 |
| 3,401,217 | 9/1968 | Burwell | 297/458 X |
| 3,695,689 | 10/1972 | Barecki | 297/460 X |
| 3,713,696 | 1/1973 | Dudley | 297/458 X |

*Primary Examiner*—James C. Mitchell
*Attorney, Agent, or Firm*—Herbert Furman

[57] ABSTRACT

A vehicle seat wherein the resilient cushion for both the seat bottom and the seat back are comprised of a supporting frame, a generally rectangular central cushion and separate side bolster cushions spaced laterally each side of the central cushion to provide air passage spaces between the central and side bolster cushions. The central cushion and the respective side bolster cushions are each covered by a separate piece of conventional seat covering material. The space between the central cushion and its adjacent side bolster cushion is bridged by a relatively air pervious material which is sewn to the covering of the central cushion and the side bolster cushion. The seat back panel has vertically extending concave depressions opening toward the rear seat and aligned with and extending generally into the air passage spaces to maximize leg room available to the occupant seated behind the seat back. Compression of the side bolster cushions and the central cushion by the weight of the seat occupant is effective to tension the relatively air pervious seat covering material across the air passage space to support the seat occupant in spaced non-contacting relation from the supporting frame and the seat back panel.

3 Claims, 8 Drawing Figures

VENTILATED VEHICLE SEAT

The invention relates to a vehicle seat and more particularly to a vehicle seat having ventilation passage therein.

It is desirable in vehicle seats to provide air passages in those areas of the seat cushion which contact the seated occupant in order to more comfortably accommodate the occupant, particularly during hot and humid weather.

It is known in the prior art to provide a plurality of small apertures in the foam rubber padding to conduct air from beneath the cushion to adjacent the relatively porous fabric or vinyl seat covering material. It has heretofore been necessary to limit both the size and the number of such apertures so that the resilient support provided to the occupant is not lessened causing the occupant to feel the seat springs or the supporting frame.

It is also desirable in motor vehicle seats, particularly in a front seat for a vehicle also having a rear seat, to provide a very thin seat back so as to maximize leg room available to the rear seat occupant.

According to the present invention, a vehicle seat is provided wherein both the seat bottom and the seat back are comprised of a supporting frame, a generally rectangular central cushion and separate side bolster cushions spaced laterally each side of the central cushion to provide air passge spaces. The central cushion and the respective side bolster cushions are each covered by a separate piece of conventional seat covering material. The space between the central cushion and its adjacent side bolster cushion is bridged by a relatively air pervious material which is sewn to the covering of the central cushion and the adjacent side bolster cushion. The seat back has vertically extending concave depressions opening toward the rear seat and aligned generally with the air passage spaces provided between the central cushion and the side bolster cushions. These depressions maximize the leg room available to the vehicle occupant seated behind the seat back. When an occupant is seated on the seat, the compression of the side bolster cushions and the central cushion by the weights of the seat occupant is effective to tension the relatively air pervious seat covering material extending across the air passage space so that the seat occupant is supported in spaced non-contacting relation from the supporting frame. The back panel of the seat back is preferably provided with spaced openings which communicate with the air passage space to enhance circulation of ventilating air to the air pervious seat covering material.

One feature of the invention is the provision of a seat back having vertically extending concave depressions which increase the leg room available to an occupant of a seat located behind the seat back.

Another feature of the invention is the provision of a seat cushion structure in which an air passage space of substantial width is provided between a central cushion and a side bolster spaced therefrom.

Another feature of the invention is the provision of an air previous seat covering material which bridges a space between a central cushion and a side bolster cushion to provide substantial ventilation to enhance the comfort of a seat occupant.

These and other features, objects and advantages will become apparent upon consideration of the specification and the appended drawings in which.

Figure 1:
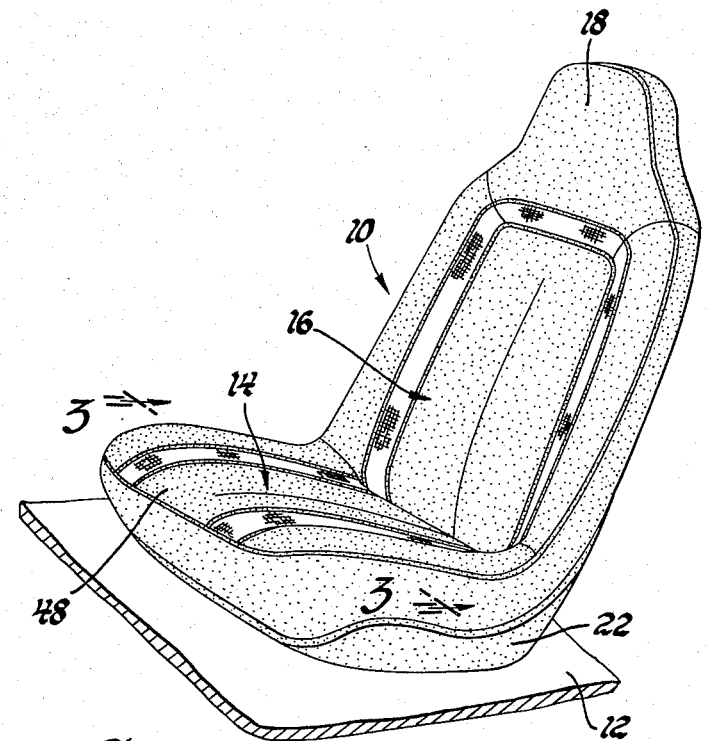
FIG. 1 is a frontal perspective view of the vehicle seat according to the invention.
Figure 2:
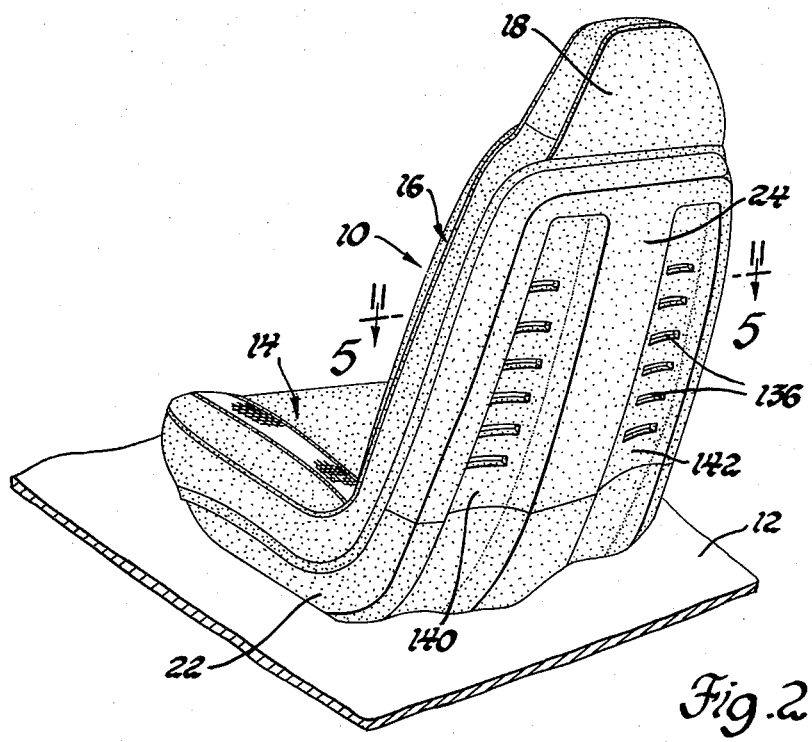
FIG. 2 is a rear perspective view of the vehicle seat of FIG. 1.

Referring to FIG. 1 a vehicle seat, indicated generally at 10, is shown according to the invention. The vehicle seat is attached to the vehicle floor 12 by a conventional seat adjusting mechanism, not shown. The vehicle seat 10 includes a seat bottom 14 and a seat back 16. The seat back 16 has an integral headrest 18. The seat bottom 14 is enclosed by a bottom trim panel 22 which is preferably a plastic molding. As best seen in FIG. 2 the seat back has a back trim panel 24 which is also a plastic molding.

Figure 3:
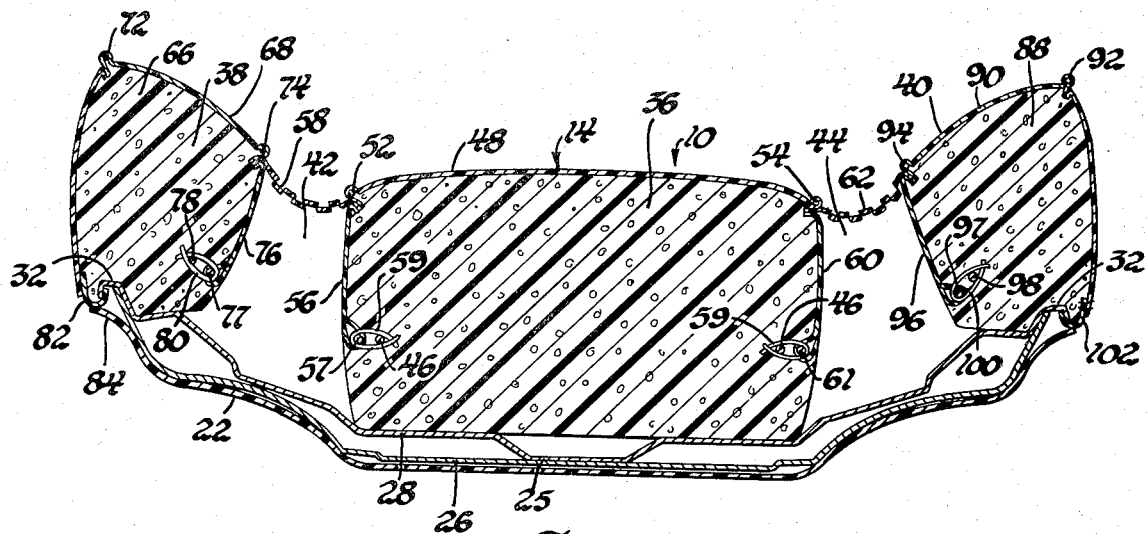
FIG. 3 is a sectional view taken in the direction of arrows 3—3 of FIG. 1 and showing the seat unoccupied.

Referring to FIG. 3 the construction of the seat bottom 14 is shown in a cross-sectional view. The seat bottom 14 is provided with a supporting frame 25 comprised of a lower stamped steel pan 26 and an upper stamped steel pan 28 which are welded together. The upper stamped steel pan 28 has a downwardly opening longitudinally extending continuous flange 32 along its outboard edges, for a purpose which will be discussed hereinafter.

The seat cushion for the seat bottom 14 includes a generally rectangular central cushion 36 of resilient foam which is mounted on the central portion of the supporting frame 25 comprises of the stamped steel pans 26 and 28. Side bolster cushions 38 and 40 are provided and extend alongside of the central cushion 36 in laterally spaced relation therefrom to provide air passage spaces 42 and 44 between the central cushion and the respective adjacent bolster cushion. The bolster cushions 38 and 40 are mounted on the laterally outboard edges of the supporting frame 25. The central cushion 36 has a wire 46 embedded in the foam thereof and extending around the perimeter of the cushion.

The main cushion 36 is covered by a piece of conventional set covering material 48, such as fabric or vinyl sheet. Welts 52 and 54 are sewn into the edges of the covering material 48 at the corners of the main cushion 36 to provide shape and stiffness. The outermost edge of the covering material 48 adjacent the welt 52 is sewn to a facing or strip of fabric 56 and a strip of air pervious material 58 which may be either a fabric of open weave or a molded or perforated vinyl mesh material. The other edge of the facing 56 has a listing wire 57 sewn therein which is attached to the wire 46 of the main cushion 36 by a conventional hog ring 59. The edge of the main cushion covering material 48 adjacent the welt 54 is similarly sewn to a facing 60 and a strip of air pervious material 62. The other edge of facing 60 has a listing wire 61 which is also hog ringed to the wire The side bolster cushion 38 includes a resilient foam bun 66 which is mounted on the outer edge of the supporting frame 25 comprised of stamped steel pans 26 and 28. The bun 66 is covered by a covering material 68 which has a welt 72 sewn into its center and a welt 74 sewn into its inner edge. The edge of the covering material 68 adjacent the welt 74 is sewn to the outer edge of the strip of air pervious material 58 and to a facing 76. A listing wire 77 is sewn into facing 76 and is in turn conventionally fastened to a wire 78 embedded in bolster bun 66 by conventional hog rings 80. The outer edge of the covering material 68 is sewn to a plastic attachment strip 82 which includes an integral upturned flange portion which is hooked under the downwardly opening flange 32 of stamped steel pan 28 to thereby attach the covering material 68 to the supporting frame. The bottom trim panel 22 has a continuous outer lip 84 which engages the plastic attachment strip 82 to hold it in engagement with the flange 32. This prevents the covering material 68 from becoming unattached when the side bolster cushion 38 is compressed.

The side bolster cushion 40 is similarly constructed and includes a foam bun 88, a covering material 90 having welts 92 and 94, as well as a facing 96 with a listing wire 97 attached to a wire 98 embedded in the resilient foam bun 88 by conventional hog rings 100. The outer edge of the strip of air pervious material 62 is sewn to the edge of the seat covering material 90. A plastic attachment strip 102 is sewn to the edge of the covering material 90 and engages the downwardly opening flange 32 of the supporting frame.

Figure 4:
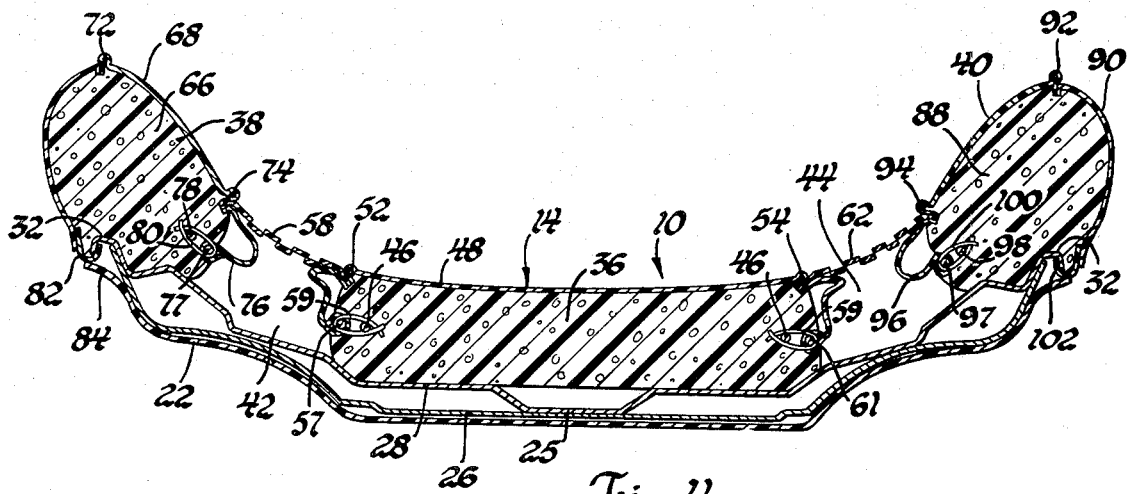
FIG. 4 is a view similar to FIG. 3 showing the seat compressed by the weight of the seated occupant.

Referring to FIG. 4 the seat bottom is shown in its compressed state as occurs when the vehicle seat is occupied. As the weight of the occupant is applied to the central cushion and the bolster cushions it will be apparent that the resilient foam buns are compressed. During such compression the strips of air pervious material 58 and 62 which connect the side bolster cushions and the central cushion are tensioned across the air passage spaces 42 and 44 to comfortably support the seat occupant in spaced non-contacting relation from the supporting frame pans 26 and 28.

Figure 5:
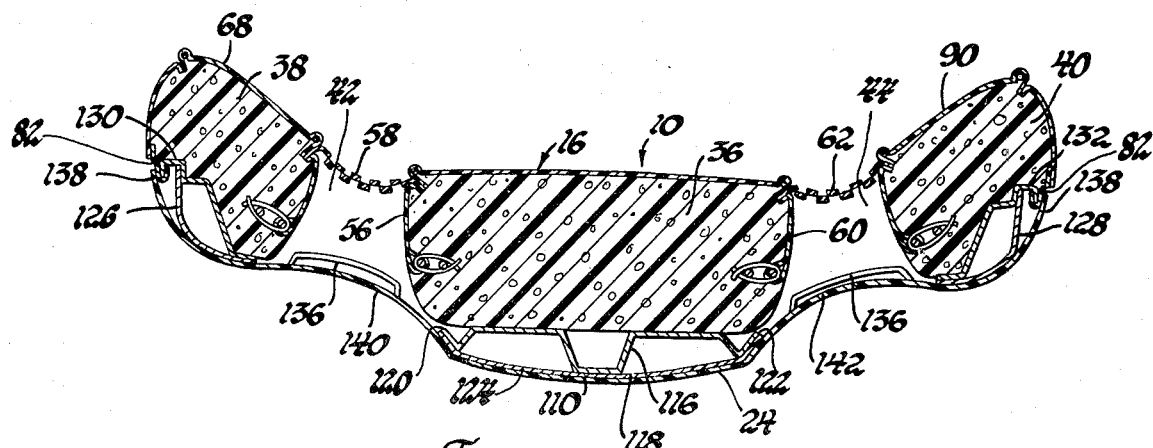
FIG. 5 is a sectional view through the seat back taken in the direction of arrows 5—5 of FIG. 2.
Figure 6:
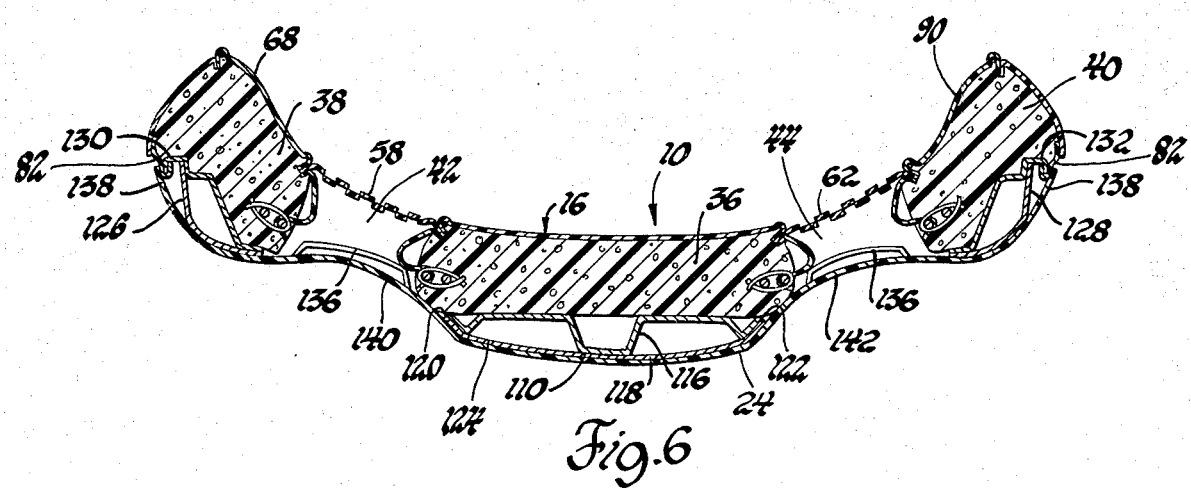
FIG. 6 is a view similar to FIG. 5 but showing the seat back cushion compressed by weight of the seat occupant.

Referring to FIG. 5, there is shown a sectional view through the seat back 16 of the vehicle seat 10. As will be seen upon study of the drawing, the construction of the seat back 16 is generally similar to the construction of the seat bottom 14 and accordingly has like elements designated by like numerals. The seat back 16 has a supporting frame 110 comprised of a forward stamped steel pan 116 and a rearward stamped steel pan 118 which are conventionally welded together. Vertically extending openings 120 and 122 are provided in the supporting frame 110 and are aligned generally with the air passage spaces 42 and 44 so that a central frame portion 124 and side bolster frame portions 126 and 128 are provided. These frame portions are of course connected together above and below the openings 120 and 122. The side bolster frame portions 126 and 128 have rearwardly opening flanges 130 and 132 at their outer edges which are similar to the downwardly opening flanges 32 and 34 of the seat bottom for facilitating attachment of the side bolster seat covering material. The back panel 24 has louvered slits 136 therein which are spaced vertically along the back panel 24 as seen in FIGS. 2 and 6. The back panel 24 has a concave depression 140 extending vertically between side bolster cushion 38 and the central cushion 36 and extending into the vertical opening 120 and 122 of the supporting frame 110 to provide increased leg space for the occupant of the seat position behind the seat back. A similar vertically extending concave depression 142 is provided in the back panel 24 intermediate the central cushion 36 and the side bolster cushion 40. The back panel is attached to the supporting frame 110 and its outermost edge portions 138 engage the plastic attachment strips 82 to retain the seat covering materials 68 and 90 on the side bolsters. As seen in FIG. 1, there is provided a headrest cushion 18 which is spaced somewhat from the top edge of the rectangular central cushion 36 of the seat back 16 so that the air passage space extends horizontally to connect the air passage spaces 42 and 44 between the side bolsters 38 and 40 and the central cushion.

Referring to FIG. 6 it will be seen that when the vehicle seat is occupied the main cushion and the side bolster cushions of the seat back are compressed somewhat and the air pervious strips 58 and 62 are tensioned across the air passage spaces to support the seated occupant in non-contacting spaced relation from the back panel 24.

Figure 7:
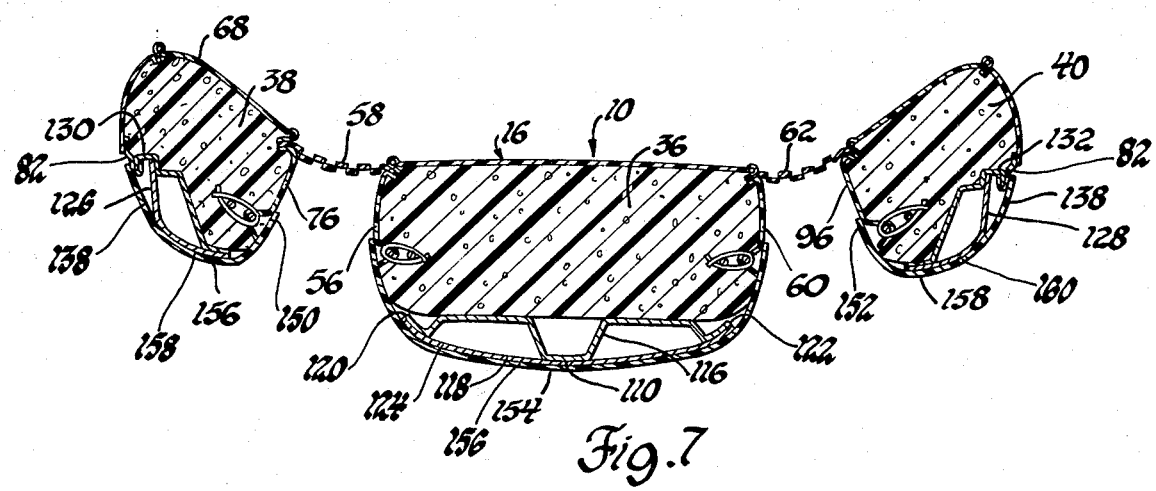
FIg. 7 is a section through a seat back constructed according to modification of the invention and showing the seat back unoccupied.
Figure 8:
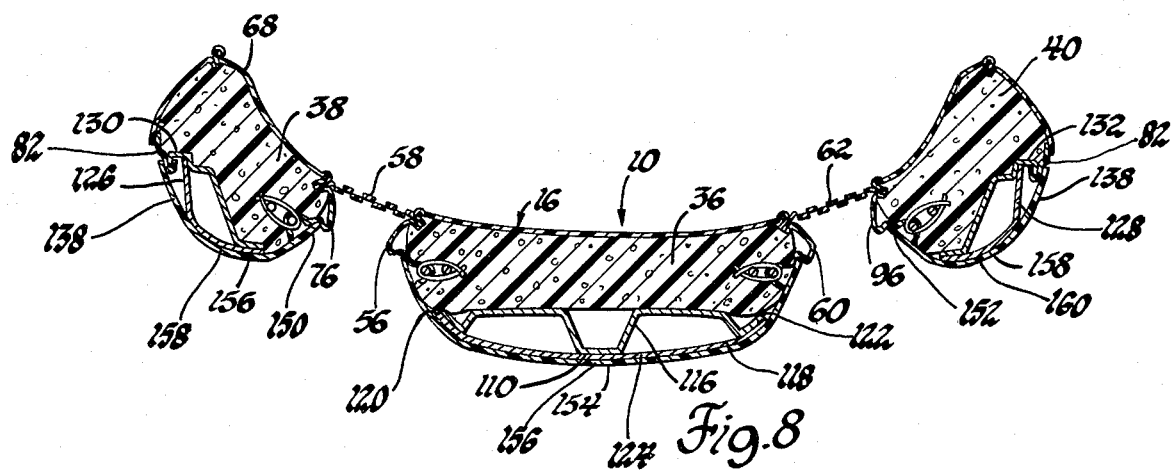
FIG. 8 is a view similar to FIG. 7 showing the seat back cushion compressed by the weight of a seated occupant.

Referring to FIG. 7 a modification of the seat back 16 is shown in which the molded back panel 154 has vertically extending openings 150 and 152 corresponding to the openings 120 and 122 of the supporting frame 110. The back panel 154 provides a central panel portion 156 and side bolster back panels 158 and 160. In this manner the leg room available for the rear seat occupant is further increased in that only the strips of air pervious material 58 and 62 separate the legs of the rear seat occupant from the occupant of the seat of this invention. In the modification of FIG. 7 the respective facing 56, 60, 76 and 96 are of the same material as the seat covering materials 48, 68 and 90 so that the resilient foam cushions are completely enclosed by the seat covering material. FIG. 8 shows the seat back of FIG. 7 in compression when occupied by a seated occupant.

What is claimed is:

1. A vehicle seat back comprising: a frame for supporting the seat back cushion, a resilient central cushion of generally rectangular shape, first and second resilient side bolster cushions extending vertically and spaced laterally of the central cushion to provide vertically extending air passage spaces between the central cushion and the first and second side bolster cushions, a seat cover covering the central cushion, first and second seat covers respectively covering the first and second side bolster cushions, an air pervious seat covering material attached to the seat cover of the central cushion and the adjacent of the first and second side bolster cushions to bridge the air passage space therebetween, back panel means attached to the back of the seat back and providing vertically extending concave depressions aligned generally with the air passage spaces between the first and second side bolster cushions and the central cushion to provide increased leg room for a passenger seated behind the seat back, the compression of the first and second side bolster cushions and the central cushion by the weight of the seat occupant being effective to tension the air pervious material across the air passage space whereby the seat occupant is supported in spaced non-contacting relation from the supporting frame and the back panel and air circulation is provided for the seat occupant.

2. A vehicle seat comprising: a seat bottom frame and a seat back frame for respectively supporting the seat bottom cushion and the seat back cushion, a resilient central bottom cushion and a resilient central back cushion respectively mounted on the bottom frame and the back frame, a resilient seat back bolster cushion of generally U-shaped opening downwardly about the central back cushion and including first and second side bolster portions extending vertically and spaced laterally of the central cushion and a headrest bolster portion extending horizontally between the first and second side bolster portions and spaced vertically of the central cushion to provide an inverted U-shaped air passage space between the central cushion and the first and second side bolster portions and the headrest portion, a back panel attached to the seat back to enclose the back frame and having vertically extending concave depressions therein aligned generally with the air passage spaces between the first and second side bolster portions and the central cushion to provide increased leg room for a passenger seated behind the seat back, a resilient bottom bolster cushion including first and second side bolster portions mounted on the seat bottom frame and spaced laterally of the central bottom cushion to provide air passage spaces between the central bottom cushion and the first and secon side bolster portions, a seat cover for separately covering each of the central cushions and bolster portions so that the air passage spaces open toward the seat occupant, and strips of air pervious seat covering material attached in tension between the spaced adjacent central cushions and bolster portions to bridge the air passage space therebetween, the compression of the side bolster portions and central cushions by the weight of the seat occupant being effective to tension the air pervious material across the air passage space whereby the seat occupant is comfortably supported in spaced non-contacting relation from the supporting frame and air circulation is provided for the seat occupant.

3. A vehicle seat back comprising: a frame for supporting the seat back cushion, a resilient central cushion of generally rectangular shape, first and second resilient side bolster cushions extending vertically and spaced laterally each side of the central cushion to provide vertically extending air passage spaces between the central cushion and the first and second side bolster cushions, a seat cover covering the central cushion, first and second seat covers respectively covering the first and second side bolster cushions, air pervious seat covering material attached to the seat cover of the central cushion and the seat cover of the adjacent of the first and second side bolster cushions to bridge the air passage space therebetween, a back panel attached to the seat back to enclose the frame and having vertically extending concave depressions therein aligned generally with the air passage spaces between the first and second side bolster cushions and the central cushion to provide increased leg room for a passenger seated behind the seat back, the compression of the first and the second side bolster cushions and the central cushion by the weight of the seat occupant being effective to tension the air pervious material across the air passage space to support the seat occupant in non-contacting spaced relation from the supporting frame and the concave depressions of the seat back panel which extend into the air passage space, and a plurality of openings in the seat back along the concave depressions thereof to permit air circulation with the air passage spaces.

* * * * *